United States Patent
Schneider et al.

[11] Patent Number: 5,809,615
[45] Date of Patent: Sep. 22, 1998

[54] HANDLE FOR HOUSEHOLD AND GARDENING TOOLS

[75] Inventors: Manfred Schneider, Wendel; Bruno Suck, Hoppstadten-Weierbach, both of Germany

[73] Assignee: Wolf-Gerate GmbH, Betzdorf, Germany

[21] Appl. No.: 809,250

[22] PCT Filed: Sep. 15, 1995

[86] PCT No.: PCT/EP95/03646

§ 371 Date: Jun. 11, 1997

§ 102(e) Date: Jun. 11, 1997

[87] PCT Pub. No.: WO96/09143

PCT Pub. Date: Mar. 28, 1996

[30] Foreign Application Priority Data

Sep. 23, 1994 [DE] Germany .................... 44 34 099.0

[51] Int. Cl.[6] .................................................. A47B 95/02
[52] U.S. Cl. .................. 16/114 R; 30/338; 403/329; 16/DIG. 41
[58] Field of Search ................. 16/114 R, 110 R, 16/DIG. 41, DIG. 24; 30/329, 332, 337, 338, 339, 342, 344; 81/489, 427.5, 177.2, 177.1, 423; 269/263, 275, 281; 403/329, 325, 320; 172/371; 56/DIG. 18

[56] References Cited

U.S. PATENT DOCUMENTS

| | | | |
|---|---|---|---|
| 4,466,377 | 8/1984 | Kolb et al. | 403/329 |
| 5,581,845 | 12/1996 | Yang | 16/110 R |
| 5,604,985 | 2/1997 | Andis et al. | 403/329 |
| 5,664,792 | 9/1997 | Tseng | 16/114 R |

FOREIGN PATENT DOCUMENTS

| | | | |
|---|---|---|---|
| 0057916 | 8/1982 | European Pat. Off. | |
| 0547628 | 6/1993 | European Pat. Off. | |
| 1163172 | 9/1958 | France | 16/258 |
| 9312468 | 11/1993 | Germany | |

*Primary Examiner*—Chuck Mah
*Attorney, Agent, or Firm*—Ostrolenk. Faber, Gerb & Soffen, LLP

[57] ABSTRACT

A handle (10) is described which can be attached by means of a fastening coupling to gardening tools which have a corresponding complementary coupling. Locking is assured in known manner by means of a leaf spring (14), the protuberance (18) of which engages in a locking hole of an inserted tool insertion pin. In order to loosen the coupling, the leaf spring (14) must be lifted out radially. This is done by means of a rocker arm (36) which acts on the free end (20) of the leaf spring (14) and in turn is actuated by axial displacement of a release button (22) which is displaceably mounted in the end of the handle. The restoring of the release button (22) is effected by the radial springing back of the leaf spring (14) which swings the rocker arm (36) back, which arm in turn exerts an axial force on the release button (22).

8 Claims, 1 Drawing Sheet

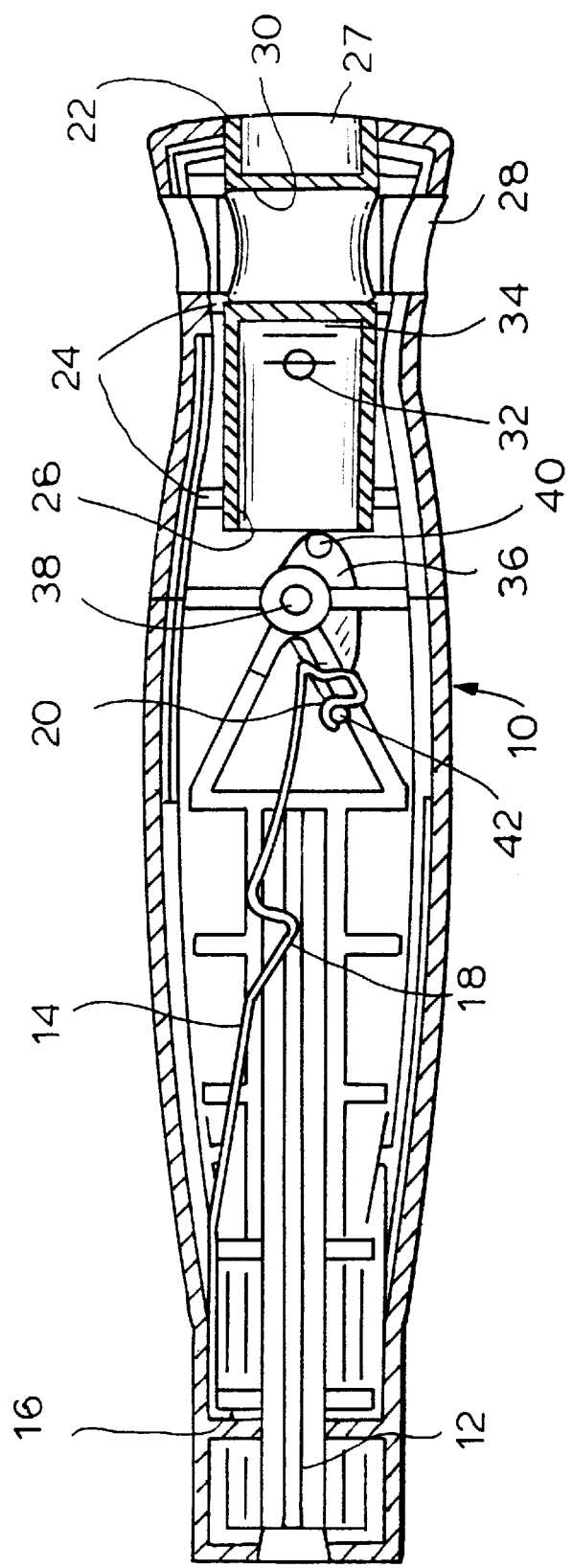

HANDLE FOR HOUSEHOLD AND GARDENING TOOLS

BACKGROUND OF THE INVENTION

The present invention relates to a handle for household and gardening tools which can be detachably attached to the handle by means of a fastening coupling, the handle-side part of the coupling having a coupling leaf spring which, extending in the longitudinal direction of the handle, has one end fixed in the handle and, with its free end which is pretensioned transverse to the axis of the handle, is movable transversely in an axial recess in the handle and bears a protuberance as locking latch, while the tool-side coupling part has a tool insertion pin which fits in the handle recess and has a locking hole into which the locking latch engages, in which connection a manually actuated release button can act on the leaf spring for unlocking. Such handles and gardening tools for them are used in large number, the fastening coupling creating the possibility of using different gardening tools with the same handle. In the tools used up to now in accordance with Federal Republic of Germany 31 30 703 C2 and Federal Republic of Germany 32 46 887 C2 the coupling arrangement is developed in the manner that the release button is supported for axial displacement or transverse displacement in the handle member and can thus act directly on the end of the coupling spring in order to lift the protuberance which serves as locking latch out of the locking hole of the tool insertion pin. These fastening couplings were designed as pole fastening couplings, in which the gardening tools were fastened to a relatively long pole and the hands grip the pole at a distance from the release button.

However, it has been found that when these known pole fastening couplings are used for relatively short handles, malfunctions can occur insofar as the thumb of the hand gripping the handle member could inadvertently displace or depress the release button, lading to the detachment of the gardening tool. A tool released in such manner could be thrown off upon further use of the handle member, which might even lead to injuries. Unintended unlocking of the coupling could possibly also occur when the tool is thrown off and the release button in unfavorable manner strikes against a hard object.

The purpose of the invention is therefore so to develop a handle of this type that unintentional loosening of the coupling is definitely avoided but intended release is easily possible.

This object is achieved by the features of the invention.

BRIEF DESCRIPTION OF THE DRAWING

The sole FIGURE is an axial selection through a handle developed in accordance with the invention.

DESCRIPTION OF THE INVENTION

Due to the fact that the release button is axially displaceable in the handle end and must be actuated from the end of the handle, contact with the release is out of the question if the gardening tool is used in accordance with its purpose. Even when the tool is placed down, the release button cannot be pushed in by error.

Since the pressing takes place in the direction of the axis of the handle and the coupling leaf spring must be deflected in radial direction in order to remove the protuberance from the locking hole, a deflection member must be provided. In the simplest case, it could be developed as a slide wedge. In such a case, however, there would be no assurance that the radially acting spring force of the leaf spring brings the release button back into the starting position, so that an additional return spring would be necessary here. In order to make such additional spring dispensable and to return the release button into its starting position by the force of the leaf spring, the deflection member is, in accordance with a preferred feature, developed as a rocker arm in the form of an angle lever, on the one lever arm of which a release button acts while the other lever arm is operatively connected with the coupling spring.

One embodiment of the invention will be described below with reference to the drawing.

The handle 10, which consists of two half shells provided with ribbing, has an axial handle recess 12, the rectangular cross section of which is adapted to the cross section of the tool insertion pin by which the tool is attached to the handle. A coupling leaf spring 14 with radial spring action is present in the rectangular cross section of the axial handle recess. The end 16 of this leaf spring 14 is firmly anchored and the leaf spring extends in the longitudinal direction of the handle, a protuberance 18 which acts as locking latch coming to lie in the cross section of the axial handle recess. Upon the inserting of the tool insertion pin into the axial handle recess 12, the leaf spring is deflected upward, as shown in the drawing, when the front end of the insertion pin contacts the run-on bevel of the protuberance. As soon as the protuberance comes to lie above the locking hole of the tool insertion pin, the leaf spring 14 springs back into the position shown in the drawing, as a result of which the steep flank of the protuberance comes to lie against the edge of the hole so that a form-locked connection is produced between handle and tool. The free end 20 of the leaf spring extends approximately in the longitudinal axis of the handle in its position of rest.

A release button 22 is held in axially displaceable manner by guide ribs 24 within the handle shells. The release button has substantially the shape of a circular cylinder which, at its inner end, forms a pressing surface 26 provided with radial ribs while, at its outer end 27, it is flush with the end of the handle. The handle shells have hanging holes 28 directed towards each other which continue in a hole 30 through the release button 22 when the button is in its position of rest. The axial displacement of the button 22 is limited by a pin 32 which passes radially through the handle shells and extends through a slot 34 in the button 22 so that the displacement is limited by the pin striking against the two ends of the slot.

For the transmitting of the movement of displacement of the release button 22 to the end 20 of the leaf spring, there is provided a rocker arm 36, developed as angle lever, which is swingable about a mounting pin 38 which is mounted in the handle shells and perpendicularly intersects the axis of the handle. The rocker arm has a switch pin 40 which rides on the inner pressing surface 26 of the cylindrical release button 22. The other arm of the rocker arm bears a release pin 42 which, in its position of rest, comes to lie alongside the free end 20 of the leaf spring 14.

When the release button 22 is depressed, the switch pin 40 rides on the inner pressing surface 26 of the release button 22 so that the rocker arm 36 is swung in clockwise direction about its mounting pin 38. In this connection, the release pin 42 contacts the free end of the leaf spring 14 and lifts it out, so that the protuberance 18 is lifted out of the locking hole in the tool insertion pin (not shown). The tool insertion pin can now be pulled freely out of the axial handle recess.

When the release button 22 is released, restoring force of the leaf spring 14 acts on the release pin 42 and swings the rocker arm 36 in counterclockwise direction so that the switch pin 40 moves the release button 22 back into its starting position shown in the drawing.

We claim:

1. A handle for household and gardening tools which can be detachably attached to the handle (10) by means of a fastening coupling extending from a handle-side to a tool-side, the handle-side part of the coupling having a coupling leaf spring (14) which extends in the longitudinal direction of the handle and has one end (16) fixed in the handle (10) and a second end (20) free and pretensioned transverse to the axis of the handle, said spring (14) movable transversely in an axial recess (12) in the handle and bearing a protuberance (18) as a locking latch, the tool-side of the coupling part having a tool insertion pin which fits in the handle recess (12), and having a locking hole into which the locking latch (18) engages, and a manually actuated release button (22) adapted to act on the leaf spring (14) for unlocking, characterized by the fact that the release button (22) is mounted for axial displacement (24) in an end of the handle and actuatable from the end of the handle and operatively connected to a deflection member (36) which, upon the axial depression of the button, lifts the locking latch (18) in radial direction out of the locking hole; that the deflection member is developed as a rocker arm (36) which is swingable around an axis which crosses or intersects the axis of the handle and interacts with the release button (22) and with the free end (20) of the leaf spring; and that the rocker arm is developed as an angle lever having one end which rides with a switch pin (40) on a surface (26) of the release button (22), while a second end of the rocker arm bears a release pin (42) which interacts with the free end (20) of the leaf spring to cause the leaf spring to move and cause release of said locking latch.

2. A handle according to claim 1, characterized by the fact that the axial movement of displacement of the release button in the handle is limited by a pin (32) which passes in radial direction through slots (32) in the release button (22).

3. A handle according to claim 2, characterized by the fact that the exterior surface of the handle comprises a pair of shells and the release button (22) has a transverse hole (30) which aligns with radial hanging holes (28) in the shells of the handle.

4. A handle according to claim 3, characterized by the fact that one surface of the handle is cambered and an end (27) of the release button, when not depressed, forms part of said one surface.

5. A handle according to claim 4, characterized by the fact that the pressing surface of the release button (22) has ribs interrupted by transverse slits.

6. A handle according to claim 1, characterized by the fact that the exterior surface of the handle comprises a pair of shells and the release button (22) has a transverse hold (30) which aligns with radial hanging holes (28) in the shells of the handle.

7. A handle according to claim 1, characterized by the fact that one surface of the handle is cambered and an end (27) of the release button, when not depressed, forms part of said one surface.

8. A handle according to claim 1, characterized by the fact that the pressing surface of the release button (22) has ribs interrupted by transverse slits.

* * * * *